United States Patent [19]

Winn

[11] Patent Number: 5,308,385
[45] Date of Patent: May 3, 1994

[54] POLLUTION ABATEMENT APPARATUS AND METHOD

[76] Inventor: Dennis Winn, 397 N. 1400 West, Cedar City, Utah 84720

[21] Appl. No.: 896,811

[22] Filed: Jun. 10, 1992

[51] Int. Cl.$^5$ .............................. B01D 47/06
[52] U.S. Cl. ........................ 95/195; 95/198; 95/200; 95/221; 95/227; 55/260; 55/263; 55/269; 261/DIG. 76
[58] Field of Search ............ 55/90, 83, 220, 260, 55/263, 267–269; 261/111, 118, DIG. 76

[56] References Cited

U.S. PATENT DOCUMENTS

| | | | |
|---|---|---|---|
| 750,351 | 1/1904 | Doyle | 55/263 |
| 1,232,865 | 7/1917 | Stevens | 55/263 |
| 1,537,065 | 5/1925 | Burdin | 55/263 |
| 2,414,718 | 1/1947 | Christensen | 261/111 |
| 2,709,580 | 5/1955 | Kameya | 261/118 |
| 2,922,490 | 1/1960 | Old et al. | 55/83 |
| 3,105,103 | 9/1963 | Old | 55/220 |
| 3,139,331 | 6/1964 | Boudreau | 55/237 |
| 3,582,051 | 6/1971 | Klein | 55/238 |
| 3,605,386 | 9/1971 | Erwin | 55/228 |
| 3,708,958 | 1/1973 | Duty et al. | 261/DIG. 76 |
| 3,760,567 | 9/1973 | Stalker | 55/222 |
| 3,888,642 | 6/1975 | Toyama | 55/263 |
| 3,920,423 | 11/1975 | Ross | 55/103 |
| 4,017,277 | 4/1977 | Van Dyke, Sr. et al. | 55/54 |
| 4,113,453 | 9/1978 | Rector | 55/263 |
| 4,257,792 | 3/1981 | Cremo | 55/230 |
| 4,624,190 | 11/1986 | Cappi | 110/215 |
| 4,818,256 | 4/1989 | Ross | 55/263 |
| 4,915,036 | 4/1990 | DeVita | 261/DIG. 76 |

FOREIGN PATENT DOCUMENTS

| | | | |
|---|---|---|---|
| 488408 | 12/1953 | Italy | 55/260 |
| 568287 | 10/1956 | Italy | 55/220 |
| 14611 | 4/1971 | Japan | 55/220 |

OTHER PUBLICATIONS

Chemical Engineers Handbook, Perry & Chilton, (5th Ed.) pp. 20-94 to 20-103.

*Primary Examiner*—Robert Spitzer

[57] ABSTRACT

An apparatus and method for removing pollutants from a gas stream wherein a spray of steam is directed against a primary deflector plate to disperse a portion of the spray and repel the spray off of the primary deflector plate against a secondary deflector plate to disperse at least a portion of the spray rebounded against the secondary deflector plate, the placement of the primary deflector plate and secondary deflector plate adapted such that the dispersed spray from the primary and secondary deflector plates forms an aerosol in the path of the gas stream, allowing the aerosol to condense into water, and recovering the condensed water.

21 Claims, 6 Drawing Sheets

POLLUTION ABATEMENT APPARATUS AND METHOD

FIELD OF THE INVENTION

This invention relates to an apparatus and method for reducing particulates and certain gasses in gas streams, particularly in exhaust streams from combustion devices.

BACKGROUND OF THE INVENTION

In the prior-art there are devices, using steam or water scrubbing, which are used to remove particulates from exhaust gasses. While these devices are effective to some degree in removing particulates and gasses from exhaust gas streams, stricter standards for exhaust emissions have created a need for more efficient pollution removal.

Furthermore, many devices of the prior art include moving parts, e.g., dispersing wheels, fans, and the like, which contributes to the building and maintaining costs of the device. In addition, many have a specialized structure and can only be applied to certain exhaust or waste-gas systems and not to existing installations without extensive rebuilding.

In Chemical Engineers' Handbook (5th Edition) by R. H. Perry, and Cecil H. Chilton, on pages 20-94 to 20-103 are disclosed various gas scrubbers which use water sprays for removing particulates from gas streams. Adding steam to the aerosol created by the water spray is also disclosed. (See page 20-96.)

U.S. Pat. No. 3,139,331 to Boudreau discloses a smoke cleansing apparatus in which the smoke is wetted with water or steam while being directed through a coiled duct. Centriftigal force causes the smoke particles to be carried away by the condensed steam to a discharge port.

U.S. Pat. No. 3,582,051 to Klein discloses a smoke cleaning apparatus wherein smoke is first directed through conical baffle of closely spaced overlapping rings, which holds back larger particles, and then through helical baffles where an apertured spray pipe sprays water to cool the smoke and fumes and entrap further particles in the smoke.

U.S. Pat. No. 3,605,386 to Erwin discloses a pollution eliminator comprising a section with steam injectors followed by a section with water injectors. In the steam injector section, baffles confine the exhaust to ensure saturation of exhaust solids.

U.S. Pat. No. 3,920,423 to Ross discloses a steam scrubber comprising steam injecters, which inject steam from a conduit in the center of a tank through which smoke is directed.

U.S. Pat. No. 3,888,642 to Toyama discloses an exhaust-stack scrubber attachment comprising a steam jet for mingling the exhaust stream with steam upstream from off-set filter baffles.

U.S. Pat. No. 4,017,277 to VanDyke, Sr. et al. discloses a direct contact water heating system that comprises transferring heat to water from flue gasses and stripping the water of dissolved gasses with steam.

U.S. Pat. No. 4,113,453 to Rector discloses an antipollution device comprising a nozzle directing steam upwardly into stack, with a series of cooling chambers to condense pollutant containing steam above the nozzle.

U.S. Pat. No. 4,624,190 to Cappi discloses an apparatus for disposal of flue gas that scrubs the flue gas with water from nozzles.

In some prior art devices, the water or steam is mechanically dispersed in the path of smoke. For example, U.S. Pat. No. 750,351 to Doyle discloses a device for removing smoke, which comprises water jets directed upwardly with sprayer or spreader plates above the jets to deflect the water spray downward.

U.S. Pat. No. 4,257,792 to Cremo discloses a stream-pressured smoke eliminator that comprises a steam supply fed to a steam-jet-operated star wheel. The star wheel dispenses a sheet-like layer of steam to intercept smoke rising through the eliminator. The eliminator can be assembled as a unit, which is inserted into a smokestack by means of a helicopter.

U.S. Pat. No. 3,760,567 to Stalker discloses a smoke cleaner that uses extractor fans to draw the smoke upward. Water is directed to the underside of the fan, which sprays the water outwardly in a spray. Steam or hot water may also be directed against the fan to remove heavy pollution constituents such as oils and tars (col. 3, lines 53 to 68).

Another device for mechanically dispersing a water stream is disclosed in U.S. Pat. No. 1,537,065 to Burdin, which describes a humidifier comprising a water nozzle and an angularly disposed adjustable target plate. In operation, water under pressure impinges against the deflecting plate and breaks the water into a spray. The outer line of the spray, after striking the bottom of the chamber, may rebound and break up further. (See page 2, lines 52 to 59).

OBJECTS OF THE INVENTION

It is, therefore, an object of the invention to provide a device that efficiently removes particulate materials from gas streams.

It is also an object of the invention to provide a device that is relatively simple to maintain and includes a minimum of moving parts for its operation.

Further objects of the invention will become evident in the description below.

SUMMARY OF THE INVENTION

An embodiment of the invention is an apparatus for removing pollutants from a gas stream comprising;

(a) a means for generating saturated steam, (b) a primary deflector plate, (c) a secondary deflector plate, (d) a steam jet means communicating with the steam generating means for directing a spray of steam against the primary deflector plate to disperse a portion of the spray and rebound the spray off of the primary deflector plate against the secondary deflector plate to disperse at least a portion of the spray directed to the secondary deflector plate, the placement of the primary deflector plate and secondary deflector plate adapted such that the dispersed spray from the primary and secondary deflector plates forms an aerosol in the path of the gas stream, (e) a means for recovering water which condenses from the aerosol, the water containing pollutants from the gas stream absorbed by the aerosol.

Another embodiment of the invention is a method for removing pollutants from a gas stream comprising directing a spray of steam against a primary deflector plate to disperse a portion of the spray and repel the spray off of the primary deflector plate against a secondary deflector plate to disperse at least a portion of the spray rebounded against the secondary deflector plate, the placement of the primary deflector plate and secondary deflector plate adapted such that the dispersed spray from the primary and secondary deflector plates forms an aerosol in the path of the gas stream, allowing the aerosol to condense into water, and recovering the condensed water.

The mean for generating saturated steam may be any suitable means for generating saturated steam known in the art. Preferably, the steam generation means uses heat from the exhaust gasses as an energy source, as more fully described below.

The steam jet means communicates with the source of steam to provide a spray which is directed against the primary deflector plate. The force of the spray against the primary deflector plate fractures or disperses a portion of the spray into a fine mist or aerosol with undispersed portions of the spray being rebounded, repelled, bounced, or ricochetted off of the primary deflector plate and upon the secondary deflector plate. Directing the rebounded spray against the secondary deflector plate further disperses the spray, generating more dispersed mist or aerosol. Further surfaces may be provided, upon which steam rebounded from the deflector plates or other surfaces can be directed and dispersed. It has been found that the multiple bouncing of the steam stream between surfaces disperses the stream more effectively than a mere sprayer alone or even a sprayer with a single deflecting surface. It has also been found that directing water (as opposed to steam) sprays against multiple surfaces is not as effective in creating an aerosol for removing pollutants from the gas stream. The multiple deflector plates combined with steam as the stream being dispersed is materially more effective in creating a mist or aerosol for removing pollutants from gas streams.

The impact of the spray against the primary and secondary deflector plates creates a steam mist or aerosol in the path of the gas stream. Preferably, the spray rebounded from the primary deflector plate toward the secondary deflector plate is directed across the path of the gas stream, which places the gas stream between primary and secondary deflector plates and insures that aerosol created by impact of the steam streams will be in the path of the gas stream. The small droplets created in the aerosol by the rebounded and dispersed steam absorbs pollutants from the gas stream. The pollutants are accordingly retained in the steam as it condenses and are recovered with the water condensed from the steam. Preferably the pollutants are removed from the condensed water and the water recycled as a feed water source to the means for generating saturated steam.

By "pollutants" is meant particulate materials to be removed from the gas stream, as well as gasses that are sufficiently soluble in the steam aerosol to be removed. The gas stream may be from any chemical or industrial process, which produces gas streams with undesirable pollutants, preferably gas streams of sufficient temperature to provide at least a portion of the energy for generating steam for the stream sprays. In the preferred application, the present invention is used in conjunction with combustion processes, more particularly incinerators, where the pollutants are combustion products, such as soot, ash, and the like. The present invention may also be applied to other combustion processes, such as exhaust streams from boilers and internal combustion engines.

DETAILED DESCRIPTION OF THE INVENTION

Figure 1:
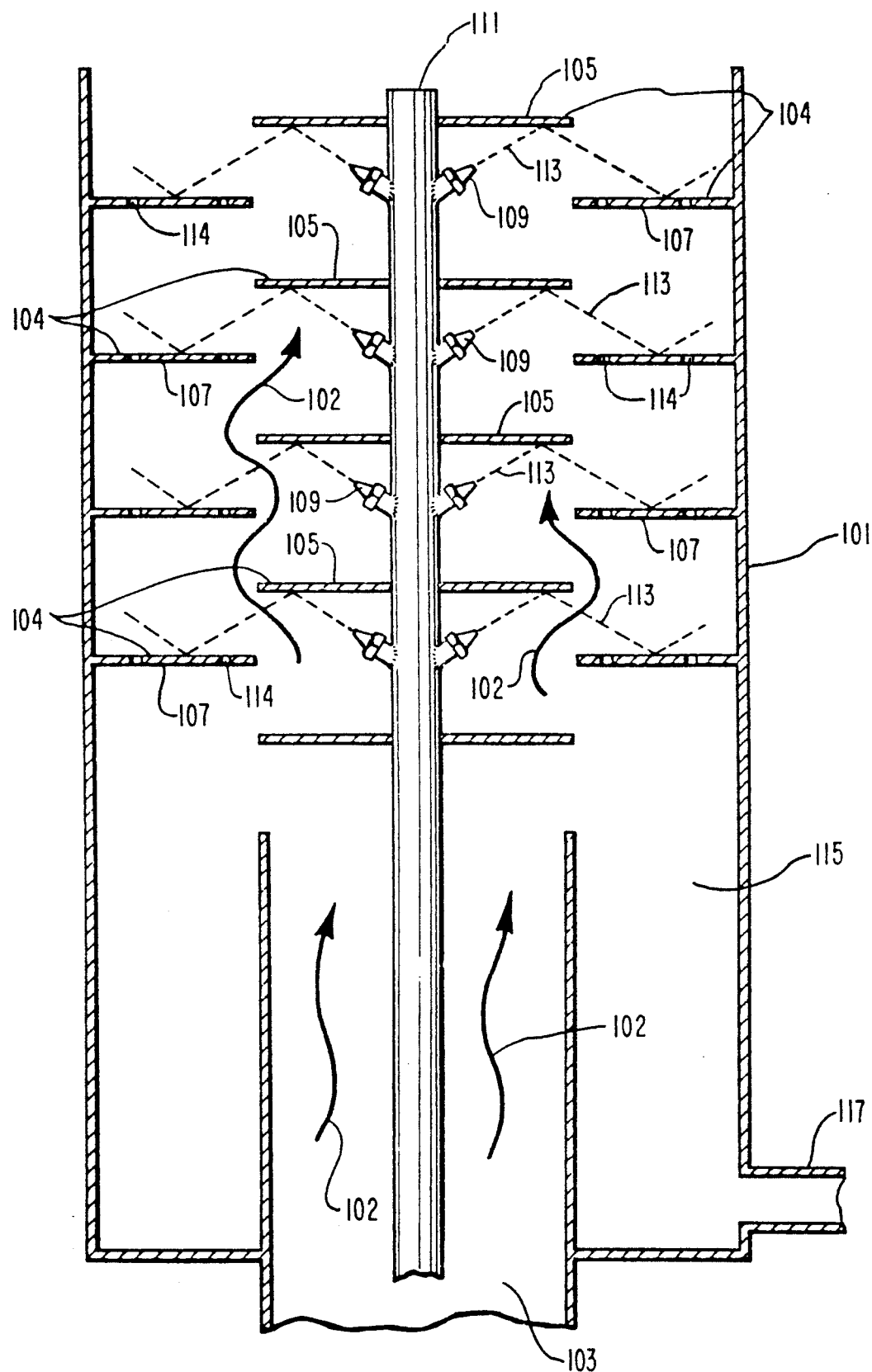
FIG. 1 is a simplified elevational cross-section of an apparatus of the invention.

Referring to FIG. 1, an apparatus of the present invention 101 is placed over a source of exhaust gas (not shown), such as an incinerator, or the like, with the exhaust gas stream (shown by the solid stream arrows 102) entering gas inlet 103 from below and passing upwardly through the apparatus 101. Multiple sets of plates 104, each comprising a primary deflector plate 105 and a secondary deflector plate 107, are placed such that the gas stream passes between the primary deflector plates 105 and secondary deflector plates 107.

A source of steam (not shown) communicates with steam jets 109, each of which direct a steam spray against a primary deflector plate 105. A portion of the spray is scattered or dispersed upon impingement on the primary deflector plate and is bounced, rebounded, ricochetted, or repelled toward the secondary deflector plate 107. The rebounded stream impinges upon the secondary deflector plate 107, which disperses steam from the rebounded spray.

In the illustrated embodiment, the primary deflector plates 105 and the steam jets are mounted on a central pedestal 111, which also functions as a manifold and feed conduit for the steam jets 109. While any orientation can be used, preferably the central pedestal 111 is vertical with the primary deflector plates 105 mounted horizontally at their center. The secondary deflector plates 107 are mounted in horizontal planes essentially parallel to the primary deflector plates 105 and in a staggered relationship to the primary deflector plates 105, i.e., the positions along a vertical axis of the secondary plates 107 being between the positions of the primary plates 105. Preferably the staggered secondary deflector plates 107 are also equidistant along a vertical axis from the two adjoining primary deflector plates 105, which provides alignment for the proper rebounding of the steam spray 113 and provides a path for the gas stream between the deflector plates 105, 107.

The steam jets 109 are mounted such that the axis of the steam spray 113 is directed against a primary deflector plate 105, preferably at an acute angle. A suitable angle is between about 20° and about 45°, preferably between about 25° and about 35°, more preferably about 30°, to the plane of the primary deflector plate 105. An acute angle is preferred as this permits the stream to be more easily rebounded off of the primary deflector plate 105 and towards the secondary deflector plate 107. Shown in FIG. 1 is the axis (shown as dotted line) of each spray 113 from each jet 109, as it is rebounded from the primary and secondary deflector plates 105, 107.

It is contemplated that only one set 104 of plates comprising a primary deflector plate 105 and a secondary deflector plate 107 be provided in an apparatus of the invention, but it is preferred to have multiple sets 104 arranged in series as illustrated. The preferred number of sets depends on the concentration of the pollutants in the entering gas stream and the desired level of purity desired for outgoing purified gas stream. In a garbage incinerator application, four sets have been found suitable.

For each primary deflector plate 105, one or more steam jets 109 are provided. In a preferred embodiment as illustrated, multiple jets 109 are mounted radially on the central pedestal 111 and directed outward and onto the primary deflector plate 105.

The shape of the primary and secondary deflector plates 105,107 may be any suitable shape. Preferably the primary deflector plates 105 are flat plates of a circular shape. The secondary deflector plates 107 are preferably flat plates annular in shape with a central circular aperture slightly larger in diameter than the primary deflector plate, i.e., the difference in diameter is just large enough so that the primary deflector plate can be moved through the aperture without interference. As further described below, this permits a modular construction, which is advantageous for assembly and maintenance. Other configurations are contemplated, such as primary and secondary deflector plates of other shapes, e.g., ovoid, quadratic, or polyhedral, or deflector plates or with curved surfaces. In addition, the positions of the primary deflector plate and secondary deflector plate may be reversed, i.e., the primary plates as outer annular plates the secondary plates as inner circular plates with the steam jets moved to the outside as appropriate.

The steam is provided at a pressure sufficient to repel or rebound the steam from the steam jet 109 of the primary deflector plate 105 and then the secondary deflector plate 107. Preferably the pressure is between about 50 psig (350 ×10$^3$ Pa) and about 1500 psig (10×10$^6$ Pa). An essential element of the invention is that the stream comprise high-pressure saturated steam, i.e., a stream of gaseous water containing liquid droplets. It has been found that high-pressure steam is significantly more effective for removing polluting materials than high-pressure water when used in conjunction with primary and secondary deflector plates.

The impingement of the spray of steam upon the primary and secondary deflector plates 105, 107 creates an aerosol in the path of the exhaust stream. The gas stream passes through aerosol and the droplets of water in the aerosol absorb polluting materials from the gas stream. The steam of the aerosol condenses and the polluting materials that have been absorbed are contained in the condensed water, which can then be recovered. The means of recovery may be by any suitable means for collecting and recovering condensate. In FIG. 1, the secondary deflector plates 107 have holes 114 through which condensed water can flow and drain from the secondary deflector plates 107. The condensed water flows through the holes 114 into an outer reservoir 115, which can be emptied through a drain 117.

FIGS. 2 to 6 shows an embodiment of the invention as applied commercially to a garbage incinerator, or the like, and illustrates means for recycling the water for steam generation, and means for recovering the pollutants from the gas stream.

Figure 2:
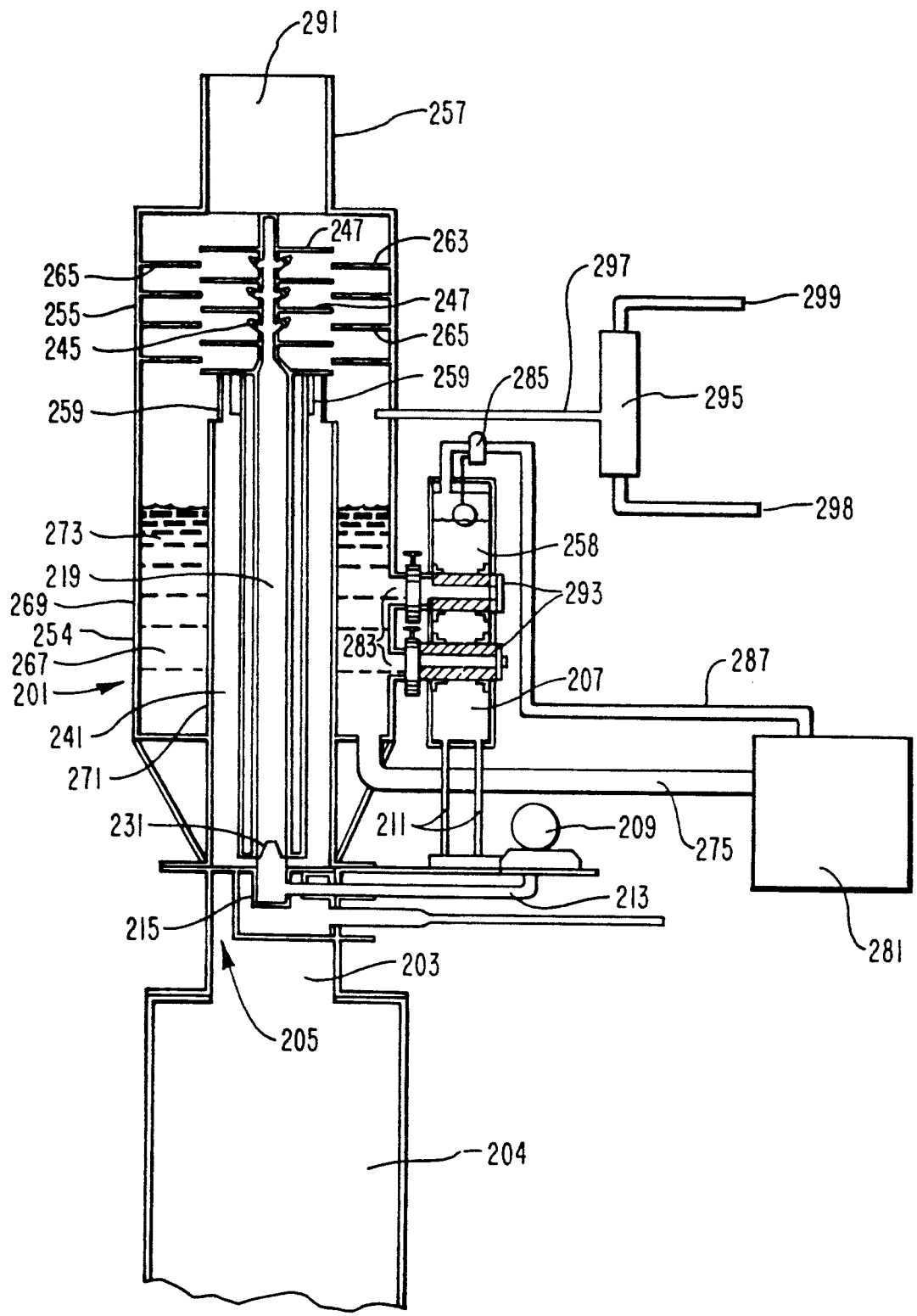
FIG. 2 is an elevational cross-section of another embodiment of the invention.

Referring to FIG. 2, apparatus of the invention 201 is placed over the outlet of a smoke stack 203 of an incinerator 204. Exhaust gas passes up the smoke stack 203 and into a bottom inlet 205 of the apparatus 201. Water is pumped from pump feed chamber 207 by pump 209 through feed chamber outlet lines 211 and through water inlet line 213 into preheater assembly 215. The pump 209, is preferably a high-pressure type to pump against the high steam pressures generated in the apparatus as previously recited.

Figure 3:
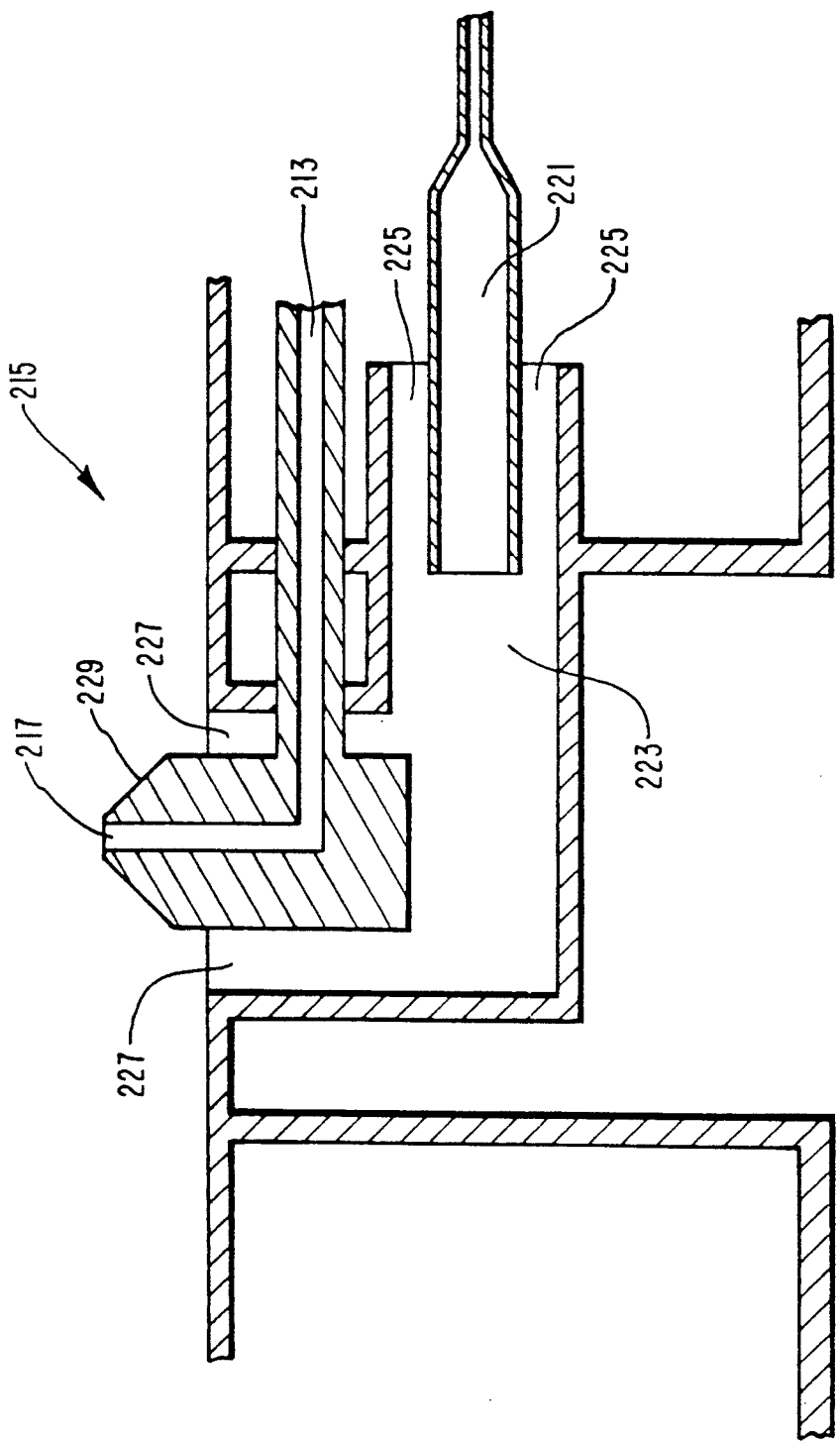
FIG. 3 is a detail cross-section of the preheater assembly of FIG. 2.

Referring to FIG. 3, which is a detail of the preheater assembly 215, water passes through preheater assembly 215 and out through preheater outlet 217. The water then passes into inner core assembly 219 (FIG. 2) where the water is heated by heat from the exhaust gas. Heat is also provided to the inner core assembly 219 for steam generation by the preheater assembly 215. The preheater assembly 215 assists in maintaining the inner core at a sufficiently high operating temperature during fluctuations of exhaust gas temperature, which may by produced by operation of the incinerator. Preheater assembly comprises a burner 221, with a combustion chamber 223 and air inlet 225. The exhaust from the combustion chamber 223 passes up through ports 227 in the chamber into the exhaust gas stream. The combustion chamber 223 is preferably placed centrally and directly under the inner core 219 in FIG. 2, to minimize restriction to flow of the exhaust gasses.

The water outlet 217 of the preheater assembly 215 passed through a machined cone 229 of solid metal with the outlet 217 passing upwards into and through the apex of the cone 229. The machined cone 229 provides a mating surface and also a support for the inner core assembly 219.

Referring again to FIG. 2, the inner core assembly 219 is placed centrally in an exhaust chamber 241. The inner core assembly 219 comprises a heat exchange section 233 and the spray section 235. The heat exchange section 233 transfers heat from the gas stream, which now includes exhaust gasses from the incinerator and exhaust from the preheater assembly 215, to the water passing through the inner core.

Figure 4:
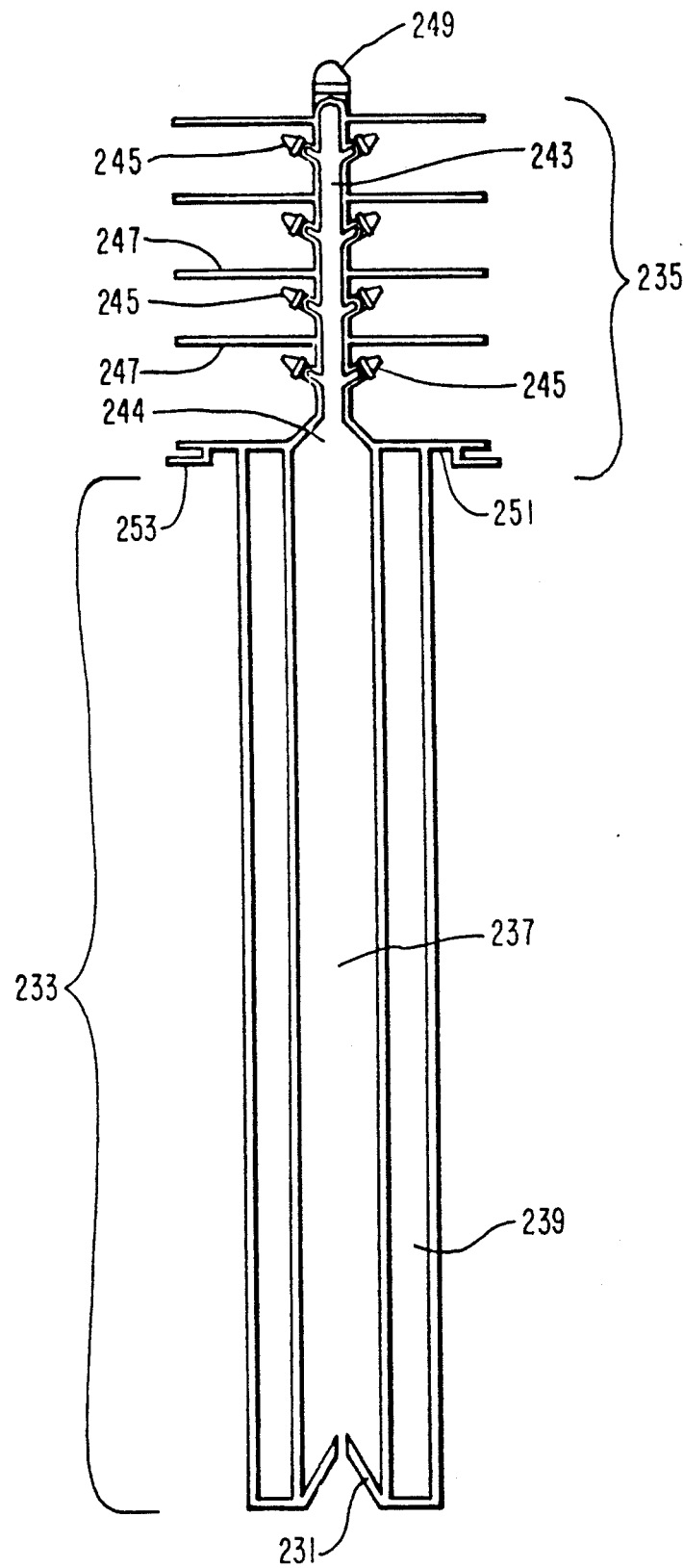
FIG. 4 is a detail cross-section of the inner core assembly of FIG. 2.

Referring to FIG. 4, which is a detail of the inner core assembly 219, cone inlet 231 is machined to join with the machined cone 229 of the preheater assembly 215 and provide a seal to the pressurized steam passing from the preheater assembly 215 to the inner core assembly 219. Water coming into the inner core assembly 219 enters first a pressure chamber 237 in the heat exchange section 233, where the water is heated to steam. The pressure chamber 237 is tube surrounded by an oil jacket 239 filled with a heat exchange liquid, preferably an oil. The hot gasses in the gas stream pass up along the outer wall of the oil jacket 239 and heat is transferred from the gas stream into the heat exchange medium, which 40 in turn passes to the water in the pressure chamber 237. In the pressure chamber 237, the water is thereby heated sufficiently to boil to steam, so the pressure chamber 237 contains two regions, a lower containing liquid water, and an upper of steam. The steam generated in the pressure chamber 237 passes out through the top of the heat exchange section 233 through a reducer 244 into the spray section 235.

The steam entering the spray section 235 passes into a central manifold tube 243 in the form of a vertically aligned central pedestal to which is connected to steam jets, atomizers, or injectors 245 for spraying the steam upwards at an acute angle to primary deflector plates 247. In the illustrated embodiment there are four primary deflector plates 247, each associated with four jets 245 mounted horizontally on the manifold tube 243 below each primary deflector plate 247. The deflector plates 247 are circular flat plates mounted at the center at the manifold tube 243 and extending perpendicularly from the manifold tube 243. The jets 245 are spaced radially at equal 90° increments and directed to spray outward and upward from the manifold tube 243 and onto the primary deflector plates 247. The angle of the axis of the spray from the jet 245 to the surface of the primary deflector plate is about 30°. To prevent the steam pressure from rising beyond safe limit, a pressure valve 249 is mounted on the top of the manifold tube 243. The primary deflector plates 247 are flat plates of a circular shape. The secondary deflector plates 263 are flat plates annular in shape with a central circular aperture slightly larger in diameter than the primary deflector plate 247.

A splash plate 251 is mounted below the primary deflector plates and is the same shape and diameter as the deflector plates. Attached to the splash plates are support brackets 253 for mounting the inner core. (Mounting of the inner core is described in more detail below.) The splash plate also keeps moisture from entering the exhaust chamber.

Figure 4A:
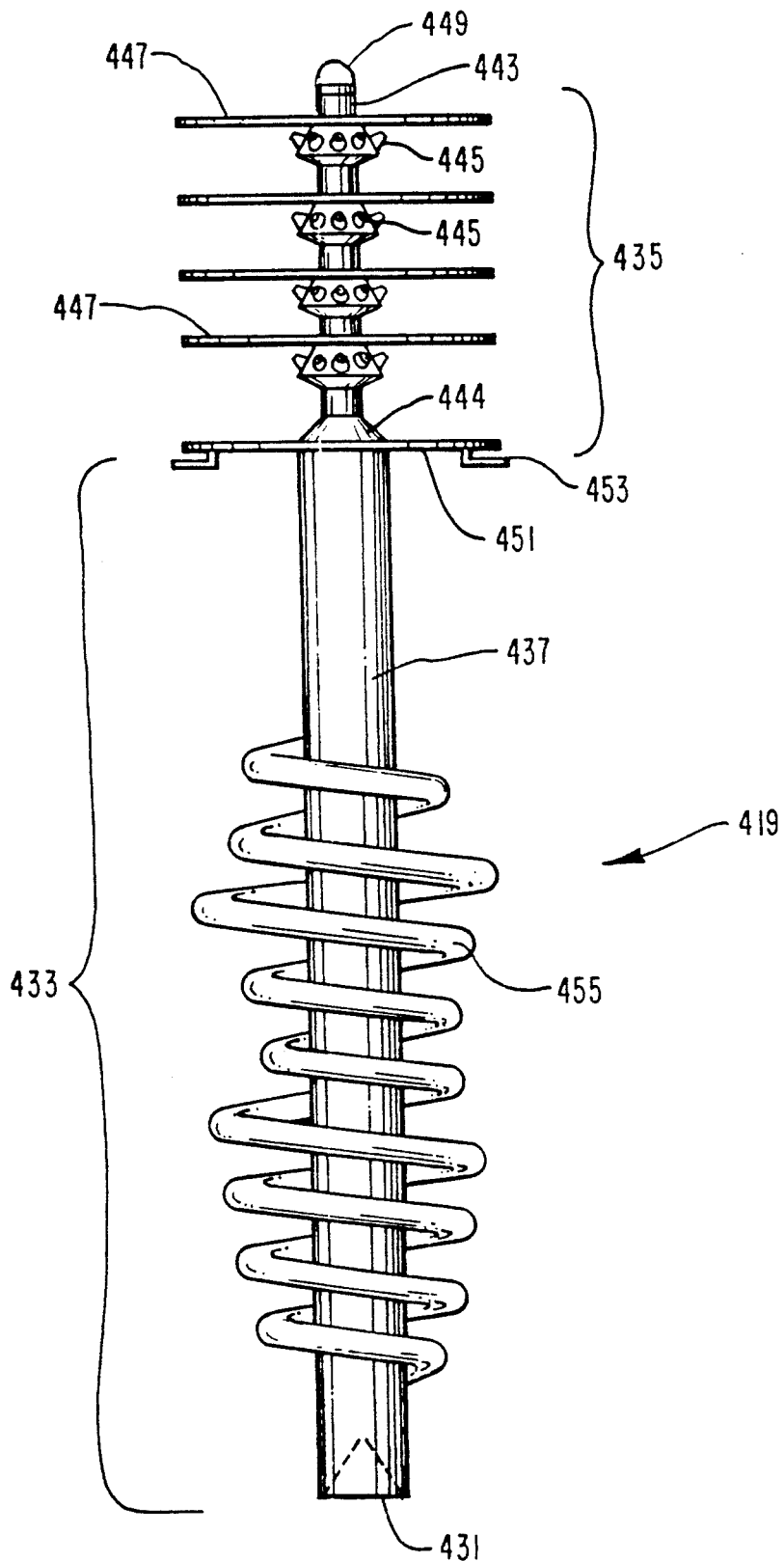
FIG. 4a is a detail view of an inner core assembly that can be used as an alternate to that of FIG. 4.

FIG. 4a shows an alternate inner core assembly, which can be used in place of the inner core assembly shown in FIG. 4. In FIG. 4a the inner core assembly 419 comprises cone inlet 431, heat exchange section 433, spray section 435, pressure chamber 437, manifold tube 443, reducer 444, steam jets 445, primary deflector plates 447, pressure valve 449, splash plate 451, and mounting brackets 453, constructed the same as in FIG. 4. Referring to FIG. 4a, the heat exchange section 433 is constructed with one or more helical tubes 455 extended from the bottom of the pressure chamber 437, up through the exhaust chamber 241 (FIG. 2), and into the top of the pressure chamber 437. In this embodiment, heat from the gas stream is transferred to the water in the pressure chamber 437 by means of the helical tube 455. Liquid water enters a helical tube 455 at the bottom, is heated and turns into steam as it passes up through the helical tube 455 and enters the upper steam section of the pressure chamber 437. Preferably the coil diameter of the helical tube 455 varies to cover the width of the exhaust chamber 241. As illustrated, the coil diameter of the helical tube 455 at the bottom is small, slightly larger than the outer diameter of the pressure chamber 437. As it coils upwards the coil diameter enlarges to near the inside diameter of the exhaust chamber 241, decreases, and then enlarges and decreases again before it enters into the pressure chamber 437.

Figure 5:
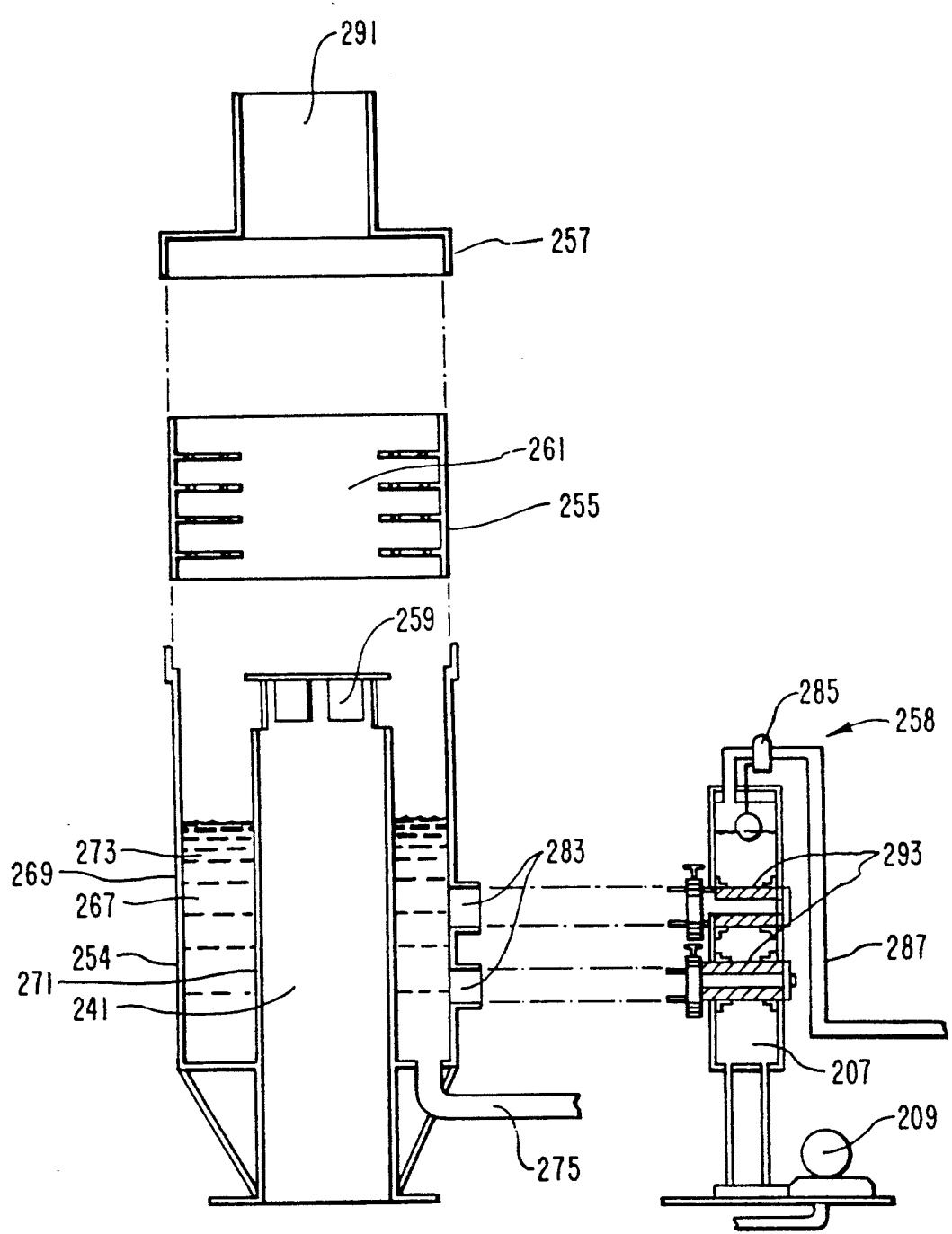
FIG. 5 is an exploded view of the outer assembly of FIG. 2.

Referring to FIG. 2 and also FIG. 5, which is an exploded view of the outer assembly, the outer assembly comprises a center section 254, a head assembly 255, a top cap 257, and water treatment assembly 258. The center section 254 comprises the exhaust gas chamber 241 for the passage of the exhaust gasses and provide a space in which the inner core 219 fits. The base of the center section 254 mounts on the top of the pre-heater assembly 215, such that the mixed exhaust from the preheater assembly 215 and the incinerator 204 flows into the exhaust chamber 241 of the center section 254. At the top of the exhaust chamber 241 are exhaust ports 259 through which the rising gas stream passes after passing the heat exchange section 233 of the inner core 219. The gas stream then passes into the spray chamber 261, which is within the head assembly 255 and contains the spray section 235 of the inner core 219. The exhaust ports 259 are dimensioned to have at least the same area for the passage of the gas stream as that of the exhaust chamber 214, so that there is minimal impediment to the flow of the gas stream.

At top of the center section 254 is mounted the head assembly 255. The head assembly 255 has the same outer diameter as that of the center section 254. The head assembly 255 comprises secondary deflector plates 263, which in the assembled apparatus (FIG. 2) are in a staggered position relative to the primary deflector plates 247, such that there is a secondary deflector plate 263 mounted below and outside of each primary deflector plate 247 to permit the steam spray rebounded from the primary deflector plate 247 to impinge upon the secondary deflector plate 263 and provide a path for the gas stream.

The secondary deflector plates have holes 265, which permits condensed steam containing pollutants removed from the gas stream to flow downward through the head assembly 255 and collect as liquid water 273 in an outer reservoir 267 in the center section 254. The outer reservoir 267 is defined by an outer annular wall 269 and the outer wall of the exhaust chamber 271.

The top cap 257 is placed on the top or exit of the head assembly 255 by means of suitable brackets, and comprises an exit flue 291 for release of the cleansed exhaust gas stream and also the vapor that was not condensed and collected in the outer reservoir 267, as described above.

From the outer reservoir 267 water is removed through a discharge conduit 275, and the water can then be disposed of or processed as desired. Preferably the discharge conduit 275 directs the water to a means for separating out the pollutants removed from the gas stream and also a means for recycling the water as a source for steam generation. In this preferred embodiment, most of the outer reservoir 267 is maintained frill of the liquid water 273 with the outer reservoir 267 surrounding at least a portion of the exhaust chamber 214, as illustrated. This allows the water 273 in the outer reservoir 267 to capture some heat that would normally be lost from the exhaust chamber 214, which can be used to warm the water source for steam generation.

The water treatment assembly 258 comprises a float or pump feed chamber 207, high-pressure pump 209, and purification unit 281 (shown only as a block in FIG. 2). The pump feed chamber 207 provides the water feed source for the high pressure pump 209, which in turn supplies the pressurized water to the inner core 219. The pump feed chamber 207 also communicates with the outer reservoir 267 through cross-over conduits 283. The cross-over conduits 283 allow the water level of the outer reservoir 267 to be controlled by the level of water in the pump feed chamber 207. In the top of the pump feed chamber 207 is a float valve 285 which controls the level of water by controlling water flow through the water input conduit 287 into the pump feed chamber 207. The cross-over conduits 283 also allow heated water from the outer reservoir 267 to mix with the water in the pump feed chamber 207, and thereby heat the water feed for the inner core assembly 219, thus recycling some of the heat for heat generation. Where the cross-over conduits 283 enter the pump feed chamber 207, annular filters 293 are provided to prevent the particular pollutants in the outer reservoir 267 from entering the pump feed chamber 207 and possibly fouling the high pressure pump 209, steam jets 245, or the like.

Water from the pump feed chamber 207 is directed to high pressure pump 209 via feed chamber outlet lines 211. The high pressure pump 209 forces the water, at the desired pressure, tip through the preheater assembly 215 and into the inner core assembly 219, as previously described.

The water from the discharge conduit 275 of the outer reservoir 267 is recycled into the pump feed chamber 207 by passing the water through the purification unit 281, which removes a substantial portion of the pollutants from the water, particularly the particulates, rendering the water a suitable source for steam generation. The purification unit may use any suitable process for treating water. Preferably, the purification unit comprises a series of settling tanks or basins (three or more in series have been found suitable) followed by a filtration unit. In each of the settling tanks the water cools, which accelerates settlement of particulates. The filtration unit may be any suitable filtration means for removing the fine residual particulates not removed in the settling tanks. The purified water is then fed by appropriate means, e.g., a pump, or gravity feed, through the water input conduit 287 into the pump feed chamber 207. The pollutants collected in the settling tanks can be recovered and dried, and used as a fuel, if appropriate, or otherwise processed to recover any fuel or mineral values.

The constriction illustrated in FIGS. 2 to 5 is a modular construction, which permits easy assembly and disassembly for maintenance. The primary deflector plates 247 are dimensioned slightly less in diameter than the aperture for the annular secondary deflector plates 263. This allows the head assembly 255 to be easily removed by first removing the top cap 257 and lifting the head assembly 255 vertically from the inner core assembly 219 and the center section. This provides easy access to the secondary deflector plates 263, primary deflector plates 247, and spray section 235, and the steam jets 245. The inner core assembly 219 is maintained in position by dimensioning the splash plate 251 to closely fit into the top of the exhaust chamber 214 of the center section 254, just above the exhaust ports 259. The inner core is held in place by its weight. At the bottom of the splash plate 251 there is a short sleeve bracket or brackets 253 that slide over the top of the exhaust chamber 241 to prevent the inner core 219 from sliding off center.

The cone inlet 231 of the inner core assembly 219 and machined cone 229 of the preheater assembly 215 are machined to fit together and provide a sealed fitting to the pressurized water from the weight of the inner core 219 on the fitting. Therefore, to remove the inner core 219, it is merely lifted up through the exhaust chamber after removing any brackets 253 holding the splash plate 251 to the center section 254. The center section 254 can then be removed providing access to the components of the preheater 215. The components of the water treatment assembly 258, are connected by conduits and appropriate shut off valves that permit the component to be easily removed and maintained as required.

Referring to FIG. 2, the apparatus of the invention preferably includes a gas separator or extractor 295. Gasses that collect in the outer reservoir are drawn through line 297, and separated into heavy gasses, through line 298, and light gasses through 299.

The dimensions of the apparatus of the invention are chosen for the particular application, considering among other things, the level of pollutants, the gas flow, size of the exhaust stack. In a particular embodiment similar to that illustrated in FIGS. 2 to 5, the primary deflector plates 247 were spaced about 8 inches (20 cm) from each other. The secondary deflector plates 263 were also spaced about 8 inches (20 cm) from each and placed in staggered relationship with the primary deflector plates 247, i.e, the vertical position of a secondary deflector plate 263 about 4 inches (10 cm) from adjacent primary deflector plates 247. The outer diameter of the center section 254 was about 20 inches (50 cm), and the aperture in the secondary deflector plates 263 was about 10 inches (25 cm). The steam jets 245 were oriented to direct the steam near the outer edge of the primary deflector plate 247 at an angle of 30° to the horizontal, such that substantial portion of the steam jet was rebounded and directed to the secondary deflector plate 263.

The apparatus of the invention may be constructed of any suitable material, such as steel, stainless steel, non-ferrous metals, high-performance polymers, and the like. Preferably, a non-corrosive material is used in the high-temperature regions exposed to a corrosive gas stream.

To accommodate large volumes of gas or exhaust gas stacks of a large diameter, a plurality of units of the apparatus of the invention may be ganged or mounted in parallel. For example, a suitable gang includes from 2 to 7 units.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention that do not depart from the spirit of the invention.

What is claimed is:

1. A method for removing pollutants from a gas steam comprising:
   (i) directing the gas stream into a chamber;
   (ii) forming an aerosol within the chamber by directing a spray of saturated steam against a primary deflector plate to disperse a portion of the spray and repelling a substantial portion of the spray off of the primary deflector plate against a secondary deflector plate to disperse a portion of the spray rebounded against the secondary deflector plate, (iii) directing the gas stream through the aerosol to allow the aerosol to remove pollutants from the gas stream by condensation of the steam, (iv) directing the pollutant-removed gas stream from the chamber, and (v) recovering the condensed water with the removed pollutants from the chamber.

2. The method of claim 1 wherein the pressure of the saturated steam is between about 50 psig and about 1500 psig.

3. An apparatus for removing pollutants from a gas stream comprising:

(a) a housing with a gas-stream inlet and a gas-stream outlet, (b) a primary deflector plate, (c) a secondary deflector plate, (d) a steam jet means for producing a spray of saturated steam, the primary deflector plate, the secondary deflector plate, and the steam jet means disposed within the housing such that the axis of the spray of steam from the stem jet means will be directed against the primary deflector plate and rebounded off of the primary deflector plate to direct portion of the spray against the secondary deflector plate, the placement of the primary deflector plate and secondary deflector plate being such that the force of the spray against the primary and secondary deflector plates will disperse a portion of the spray and the dispersed spray forms an aerosol in the path of a gas stream passing through the housing, and (d) a means for recovering water which condenses from the aerosol, the water containing pollutants from the gas stream absorbed by the aerosol.

4. The apparatus of claim 3 wherein there is a plurality of primary deflector plates with corresponding secondary deflector plates and steam jet means.

5. The apparatus of claim 4 wherein the primary deflector plates are mounted on a central pedestal.

6. The apparatus of claim 5 wherein the primary deflector plates are flat, circular plates mounted on the central pedestal at the center of the primary deflector plate.

7. The apparatus of claim 6 wherein the secondary deflector plates are flat, annular plates with a central aperture slightly larger than the diameter of the primary deflector plates.

8. The apparatus of claim 7 wherein the secondary deflector plates and primary deflector plates are disposed horizontally and the central pedestal is disposed vertically.

9. The apparatus of claim 7 wherein the secondary deflector plates are mounted in a staggered alignment with respect to the primary deflector plates.

10. The apparatus of claim 9 wherein a secondary deflector plate is equidistant from two adjoining deflector plates.

11. The apparatus of claim 7 wherein the steam jet means is disposed with respect to the primary deflector plate such that it can direct the spray of steam from the steam jet means against the primary plate with the angle of the axis of the spray of steam to the plane of the primary deflector plate being an acute angle.

12. The apparatus of claim 11 wherein the angle of the axis of the spray of steam to the plane of the primary deflector plate is between about 20° and about 45°.

13. The apparatus of claim 11 wherein the angle of the axis of the spray of steam to the plane of the primary deflector plate is between about 25° and about 35°.

14. The apparatus of claim 11 wherein the angle of the axis of the spray of steam to the plane of the primary deflector plate is 30°.

15. The apparatus of claim 3 additionally comprising a means for removing particulate materials from the water recovered from the means for recovering water and a means for directing the recovered water to the steam jet means as a source for the saturated steam.

16. The apparatus of claim 3 wherein the steam jet means comprises a means for generating saturated steam which transfers heat from the gas to water for steam generation.

17. The apparatus of claim 16 wherein the means for generating steam comprises a jacket containing a heat transfer fluid, which jacket surrounds a chamber where water is heated to steam.

18. The apparatus of claim 16 wherein the means for generating steam comprises a tube extending into the path of the gas stream, such that the water is conveyed through the tube and heated to steam as it passes through the hole.

19. The apparatus of claim 16 wherein the steam jet means additionally comprises a means for preheating the water before being converted to steam by the steam generation means.

20. The apparatus of claim 3 wherein the secondary deflector plate contains holes for draining condensed water from the aerosol from the secondary deflector plate.

21. An apparatus for removing pollutants from a gas stream comprising:

(a) a housing with a gas-stream inlet and a gas-stream outlet, (b) primary deflector plate aligned in an essentially horizontal plane, (c) a secondary deflector plate on a plane in essentially parallel alignment with the primary deflector plate, the primary deflector plate and the secondary deflector plate spaced in the housing to permit flow of gas between primary and secondary deflector plates, (d) a steam jet means for producing a spray of saturated steam onto the primary deflector plate at an acute angle, such that the axis of the jet of saturated steam rebounds onto the secondary deflector plate and creates an aerosol in the path of the gas stream between the primary and secondary deflector plates, and (e) a means for recovering water which condenses from the aerosol, the water containing pollutants from the gas stream absorbed by the aerosol.

* * * * *